United States Patent [19]
DeHaan et al.

[11] Patent Number: 5,370,795
[45] Date of Patent: Dec. 6, 1994

[54] PLATE SHIFTER FOR FILTER PRESS

[75] Inventors: Daniel DeHaan; Joel D. DeHaan, both of Zeeland; John A. VerBerkmoes, Nunica; Nelson H. Tansey, Kalamazoo, all of Mich.

[73] Assignee: JWI, Inc., Holland, Mich.

[21] Appl. No.: 904,406

[22] Filed: Jun. 25, 1992

[51] Int. Cl.$^5$ ............................................ B01D 25/172
[52] U.S. Cl. ................................. 210/225; 210/230; 100/199
[58] Field of Search ................. 210/225, 230; 100/198, 100/199

[56] References Cited

U.S. PATENT DOCUMENTS

| | | | |
|---|---|---|---|
| 4,102,788 | 7/1978 | Broad | 210/130 |
| 4,172,792 | 10/1979 | Heinrich et al. | 210/230 |
| 4,181,615 | 1/1980 | Wilms | 210/230 |
| 4,226,721 | 10/1980 | Baas | 210/230 |
| 4,405,457 | 9/1983 | Buss et al. | 210/225 |
| 5,106,499 | 4/1992 | Davis | 210/230 |
| 5,110,466 | 5/1992 | Tanii | 210/225 |

FOREIGN PATENT DOCUMENTS

| | | | |
|---|---|---|---|
| 60285 | 11/1968 | Germany | 210/231 |
| 3946 | 11/1968 | Japan | 210/230 |

OTHER PUBLICATIONS

JWI "J–Press Liquids–Solids Filtration and Separation Equipment", JWI, Inc., Jun. 1987, 16 pages.
JWI "Filter Press Solutions", JWI, Inc., Jul. 1991, original brochure (14 pages).

*Primary Examiner*—Matthew O. Savage
*Attorney, Agent, or Firm*—Flynn, Thiel, Boutell & Tanis

[57] ABSTRACT

A filter press plate shifter assembly provided with a shifter housing having a center part which passes over the filter plates and housing parts positioned adjacent opposite side rails. The housing parts are rollingly supported on rods which extend along the side rails. One housing part mounts a rotary pneumatic motor and a drive roller which drivingly engages the rod. Each housing part mounts a plate shifter unit having a pneumatic shift cylinder which is provided with relatively fixed and movable plate shifting blades. A pneumatic lift cylinder pivots the shift cylinder upwardly so that the blades project between handles of adjacent filter plates, following which the shift cylinder is energized so that the movable blade engages and shifts the endmost plate toward the open press head. A pressure sensor retracts the shift cylinder and lowers the lift cylinder, and a further pressure signal activates the drive motor to advance the housing to the next position for engagement with the next plate to begin the next plate shifting cycle.

11 Claims, 8 Drawing Sheets

PLATE SHIFTER FOR FILTER PRESS

FIELD OF THE INVENTION

This invention relates to a filter press and, more particularly, to an improved plate shifting mechanism for automatically and sequentially shifting individual filter plates into an open position when dumping of filtrate is desired.

BACKGROUND OF THE INVENTION

Filter presses are well known and extensively utilized for separating solids from slurries. Such presses employ a plurality of filter plates which are held in contacting relationship between fixed and movable head members while the slurry is pumped into and through the press for collecting the solid in the form of filtrate or cake between adjacent filter plates. When the press is full, then the movable head is backed away from the plates into an open position, and thereafter the plates are individually and sequentially moved into an open position adjacent the movable head to permit discharge of the cake which has collected between the adjacent plates. To permit movement of the plates into an open position, numerous plate shifting mechanism have been provided on presses for permitting either automatic or manual control over the plate movement and cake discharge.

In one known press as manufactured and sold by the Assignee hereof, the plate shifter assembly is manually controlled by a press operator. The shifter assembly employs a downwardly-opening arch-shaped shifter housing which spans the top of the plates and has housing parts movably supported adjacent opposite sides of the press, which housing parts have shifter units mounted thereon. The complete shifter assembly is initially manually rollingly moved longitudinally along the press by the operator until the housing is positioned over the row of filter plates, and the operator precisely positions the assembly so that the plate shifting blades are aligned with the spaces between the handles of the endmost and next adjacent plates. When reaching this position, the operator stops the manual movement of the housing and then activates a control valve which in turn activates pressure cylinders associated with the shifter units. This causes the shifter blades to move upwardly between the handles, and then further cylinders are energized to cause the shifter blades to extend outwardly and engage the handles of the endmost plate to thus push the endmost plate toward and substantially into contact with the movable head. After the plate has been shifted to the opened position, and the cake discharged from between the two opened plates, then the operator again activates the control valve into a reversing position so that the shifter units are retracted and lowered into their original positions. The operator then manually moves the shifter housing until the shifter blades are aligned with the spaces between the next adjacent pair of plate handles, and the cycle is again repeated. This cycle is repeated until all of plates have been shifted so as to permit discharge of the cake. This entire cycle is almost wholly manually controlled, requiring constant manual supervision and manipulation, and hence does not provide efficient and time-saving discharge of the press, particularly due to the required utilization of manpower.

To overcome the required manual manipulations required for operation of presses of the type described above, other filter presses have been developed which incorporate shifting assemblies for permitting automatic sequential shifting and opening of the filter plates to permit cake discharge. Such assemblies traditionally employ shifter mechanisms positioned adjacent opposite sides of the press, and such shifter mechanisms necessarily employ drive units which extend throughout substantially the complete length of the press. Such drive units often comprise elongate drive chains which extend throughout the length of the press adjacent each side thereof, which chains are engaged by sprockets provided on the shifter housings to permit movement of the latter longitudinally along the press. To achieve synchronization between the drive units located on opposite sides of the press, some type of driving connection must be provided for extension transversely across the press, and this, coupled with the length of the chains extending along both sides of the press, make the overall structure mechanically complex and bulky, and hence expensive. Such drive structures are also subjected to significant exposure to chemicals and the like which may be in use in the surrounding environment, and hence such drive units have been observed to experience undesired chemical corrosion and the like.

Other automated shifter assemblies, in an attempt to eliminate elongate chains, have gone to so-called "rodless" pressure cylinders which are provided adjacent opposite sides of the press and movably supported on elongate guide rods which extend lengthwise throughout the press adjacent opposite sides thereof. These rodless cylinders, however, are themselves relatively expensive and can create undesired maintenance and repair. Further, it has been observed that using rodless cylinders adjacent opposite sides of the press, particularly in long presses employing large numbers of plates, can create operational problems in that it is significantly impossible to maintain proper control and synchronization over the rodless cylinders disposed on opposite sides of the press, and hence operation can cause sufficient nonsynchronous movement as to effect skewing of the plates so that the plate shifting operation can often become difficult to achieve.

Samples of typical plate shifting mechanisms which have been provided so as to permit more automated shifting of the plates are illustrated by U.S. Pat. Nos. 3,232,435, 3,251,472, 3,306,455, 3,331,511, 3,637,082, 3,712,460, 3,807,298, 4,295,970, 4,806,239 and 4,963,255.

Accordingly, it is an object of this invention to provide an improved plate shifting assembly for a filter press, which shifting assembly permits the filter plates to be automatically, sequentially and individually shifted into an open position when discharge of filter cake is desired, and which overcomes many of the disadvantages associated with automated shifting mechanisms of the type currently in use, as briefly described above.

More specifically, it is an object of this invention to provide an improved filter plate shifting assembly for a filter press, as aforesaid, which does not require use of elongate drive elements or mechanisms extending lengthwise throughout substantially the length of the press adjacent opposite sides thereof, but instead permits the drives to be entirely contained within small shifter housing parts which are positioned adjacent and traverses along opposite sides of the press frame.

It is a further object of the invention to provide an improved filter plate shifting assembly, as aforesaid, which when activated from a home storage position will readily traverse to a position for engagement with the endmost plate and will thereafter automatically and sequentially engage and move each endmost filter plate into an open position until all plates have been so moved, and whereupon the assembly will then automatically return to the home position and remain inactive until again activated for carrying out a further cake dumping operation.

It is still a further object of the invention to provide an improved filter plate shifting assembly, as aforesaid, which is compact, mechanically simple, and suitably protected from the environment to permit improved operating performance and efficiency.

It is also an object of the invention to provide an improved filter plate shifting assembly, as aforesaid, which is essentially self-contained in that the drive motors and all shifting drives including pressure cylinders and the like are all pneumatically driven and controlled so that only pressurized air need be supplied to the shifter housing, and the overall assembly is capable of carrying out the automatic and sequential moving of the filter plates solely under the control and actuation of air devices.

It is another object of the invention to provide an improved filter plate shifter assembly, as aforesaid, which permits the individual filter plates to be shifted in a manner whereby the shifting is sensitive to air pressure for terminating and reversing the shift mechanism drives, rather than being stroke sensitive, whereby the same mechanism can successively effect the desired automatic shifting of the plates even though the stack of plates in the press may include one more or less plate than is normally expected and which would prevent successful operation of a stroke sensitive shifting device.

In the filter press plate shifter assembly according to a preferred embodiment of the invention, there is provided a shifter housing having a tunnel-like center part which passes over the filter plates and has lower ends of the legs thereof provided with substantially closed housing parts which are positioned adjacent the opposite side rails of the press. These housing parts are rollingly supported on elongate support rods which extend along the press side rails for permitting the shifter housing to be moved longitudinally lengthwise of the press. One housing part has a rotary pneumatic motor mounted therein which drives a drive roller which is spring urged into driving engagement with the respective support rod. Each housing part mounts a plate shifter unit involving a pneumatic shift cylinder which is hinged at one end and provided with relatively fixed and movable plate shifting elements or blades at the other end. A pneumatic lift cylinder, when energized, pivots the shift cylinder upwardly so that the shift blades project into the space between the handles of adjacent plates, following which the shift cylinder is energized so that the movable blade engages the handle of the endmost plate and shifts the plate lengthwise of the press toward the open press head to permit discharge of cake from between the adjacent plates. When the plate effectively stops moving, either due to full extension of the shift cylinder or contact of the plate against another plate or against the movable head, then a pressure sensor retracts the shift cylinder and substantially simultaneously lowers the lift cylinder so that the shifter unit is in a position to initiate a new cycle. When in its original position, a further pressure signal again activates the drive motor to advance the housing to the next position for engagement with the next plate. The housing mounts thereon a plate sensing mechanism which engages and senses the leading plate in the stack and transmits a pressure signal for stopping the pneumatic drive motor. Each housing part also preferably mounts a pneumatically-actuated brake which is activated and engages the rod to hold the housing stationary when the motor is stopped.

Other objects and purposes of the invention will be apparent to persons familiar with structures of this general type upon reading the following specification and inspecting the accompanying drawings.

Figure 1:
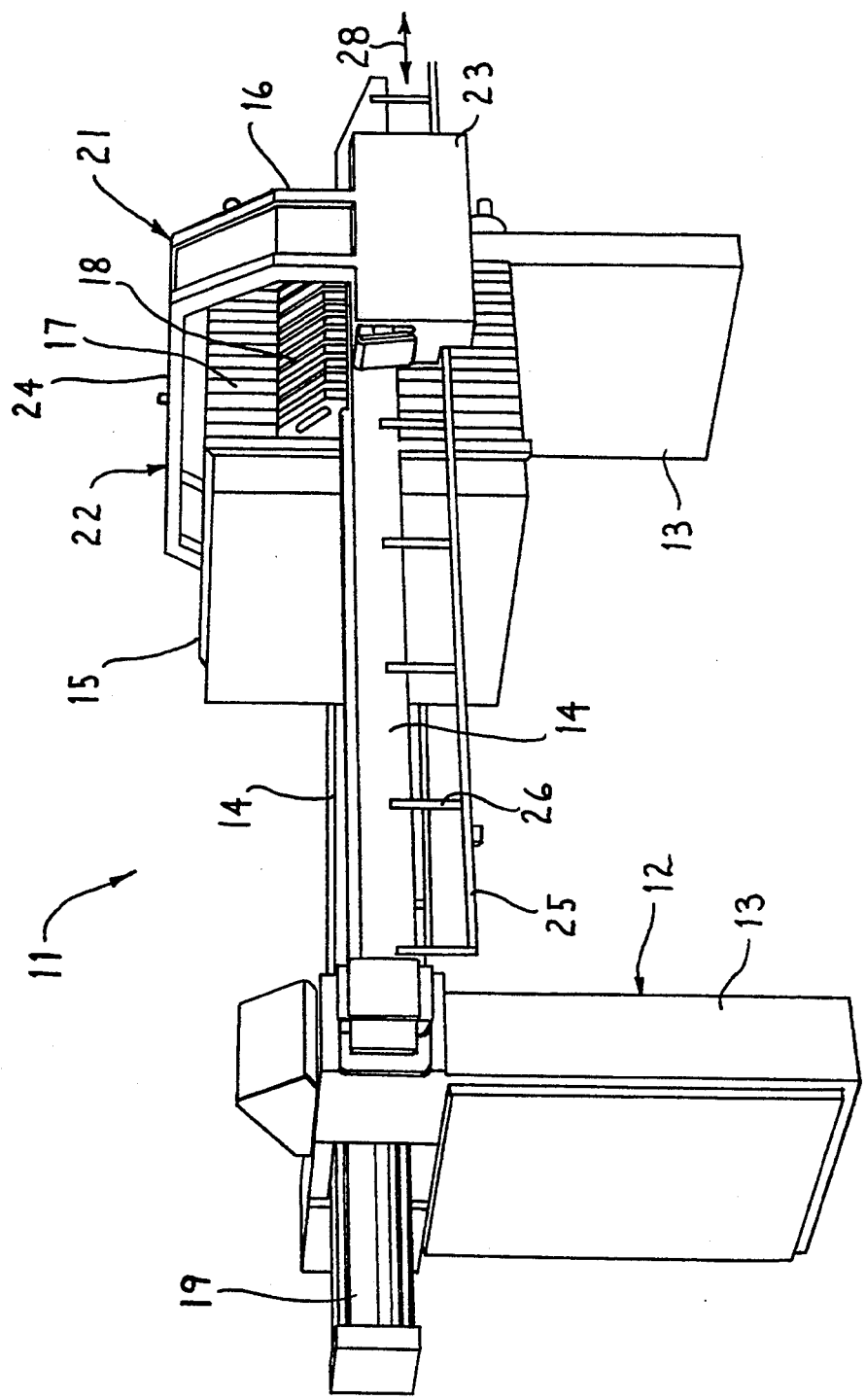
FIG. 1 is a perspective view of a prior art filter press incorporating the improved filter plate shifting assembly of the invention thereon.

Certain terminology will be used in the following description for convenience in reference only, and will not be limiting. For example, the words "upwardly", "downwardly", "rightwardly" and "leftwardly" will be used to refer to directions in the drawings to which reference is made. The word "forward" will be used to refer to a direction of movement toward the fixed head end of the press, namely rightwardly in FIGS. 1 and 2, and the word "rearward" will be used to refer to the opposite movement direction. The words "inwardly" and "outwardly" will be used to refer to directions toward and away from, respectively, the geometric center of the press and designated parts thereof. Said terminology will include the words specifically mentioned, derivatives thereof, and words of similar import.

DETAILED DESCRIPTION

Figure 2:
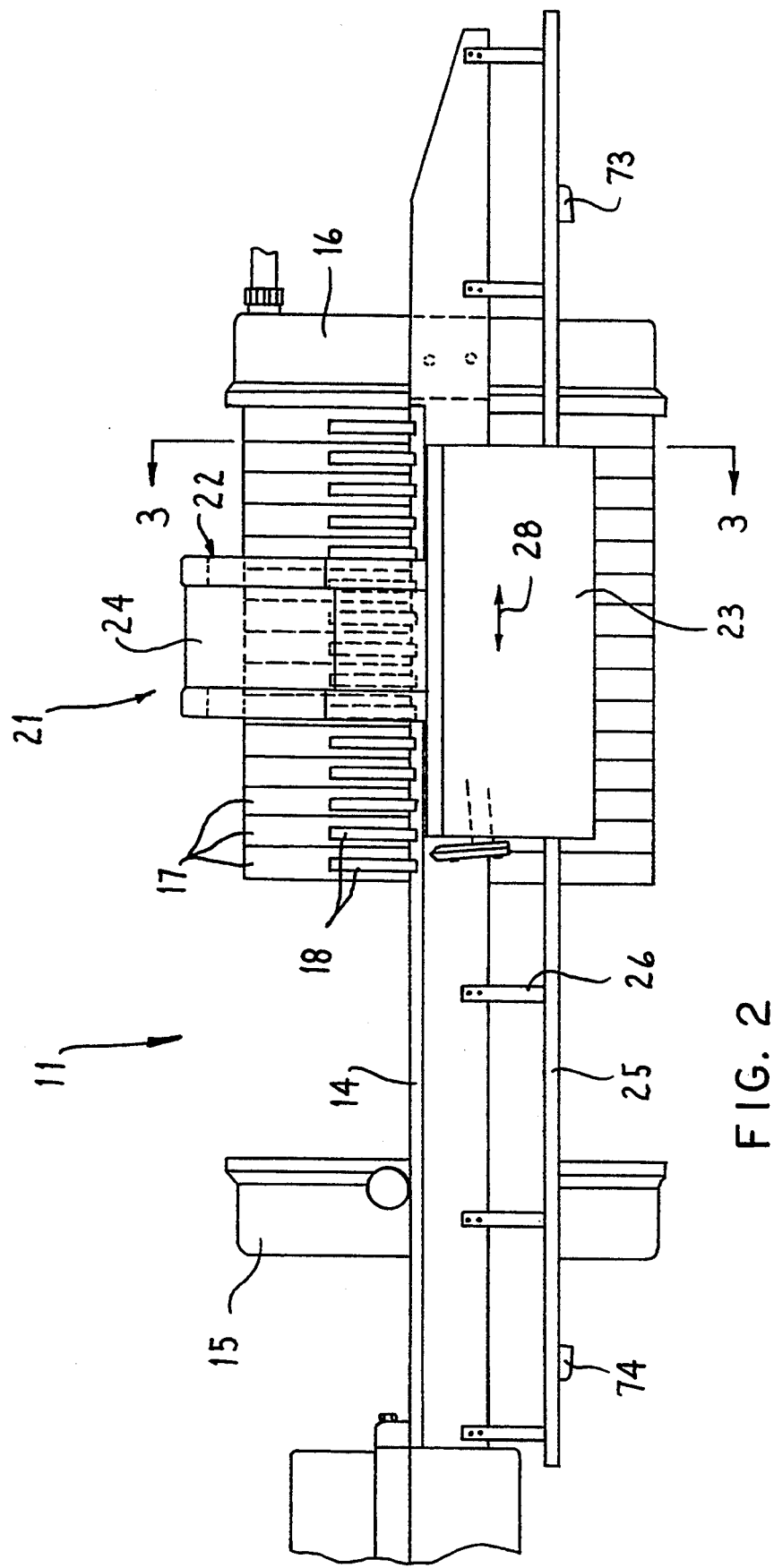
FIG. 2 is a fragmentary side elevational view of the filter press and illustrating the plate shifter assembly positioned for engagement with and shifting of the endmost plate in the stack.

FIGS. 1 and 2 illustrate a filter press 11 having a frame 12 which includes a pair of end frames or supports 13 which are rigidly joined together by a pair of generally parallel and horizontally extending side rails 14 which are sidewardly spaced apart. The press includes a head 15 which is movably supported on the rails 14 for movement toward and away from a further head 16 which is fixedly secured adjacent the other end of the frame, with a plurality of conventional filter plates 17 being disposed so as to be held in clamped seal relationship to another between the heads 15 and 16 when the press is operational. Each filter plate 17 has handles 18 projecting outwardly from opposite sides thereof which slidably support the plates on and between the side rails 14. A conventional pressure cylinder 19 cooperates with the movable head 15 to clamp the row or stack of filter plates 17 between the heads during press operation.

The filter press also includes a plate shifter assembly 21 which includes a generally U-shaped or tunnel-like housing 22 defined by generally hollow housing parts 23 which are disposed adjacent the opposite side rails 14 and are rigidly joined together by an arched center part 24 which is adapted to pass over the filter plates 17 and the movable head 15. This shifter housing 22 is supported for movement horizontally longitudinally along the filter press, and for this purpose is supported on elongate guide or support rods or members 25 which are fixedly joined by hangers 26 to the respective side rails 14, whereby the support rods 25 are horizontally elongated in parallel relationship to the rails and are spaced sidewardly therefrom by a small distance. Each housing part 23 has a pair of rollers 27 provided thereon which are rollingly engaged with the respective rod 25 so that the entire shifter assembly 21 can be moved longitudinally along the press substantially as indicated by the arrows 28.

Figure 3:
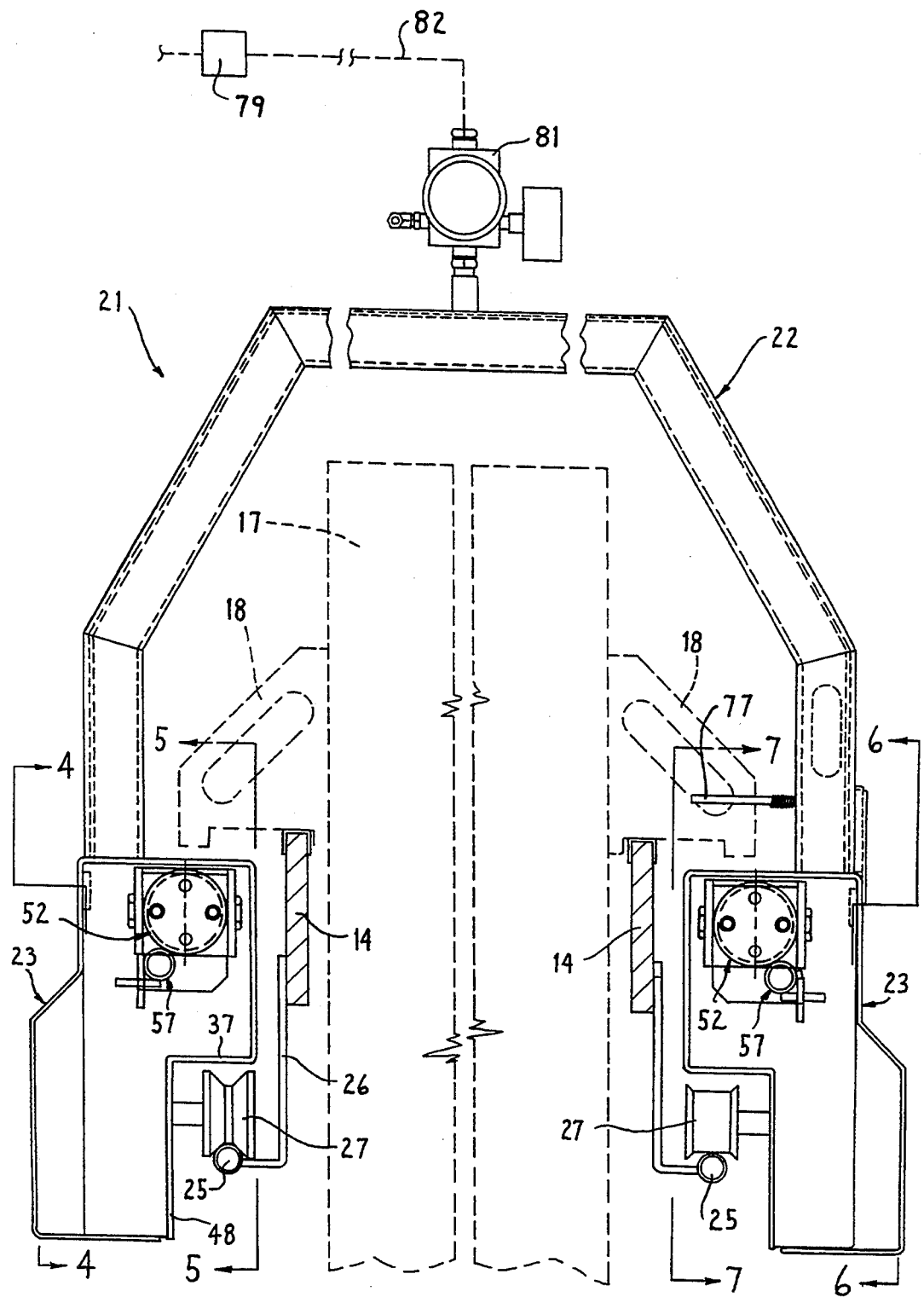
FIG. 3 is an end elevational view, taken substantially from the rightward end of FIG. 2, of the tunnel-like shifter housing and its cooperation with the press side rails and filter plates.
Figure 4:
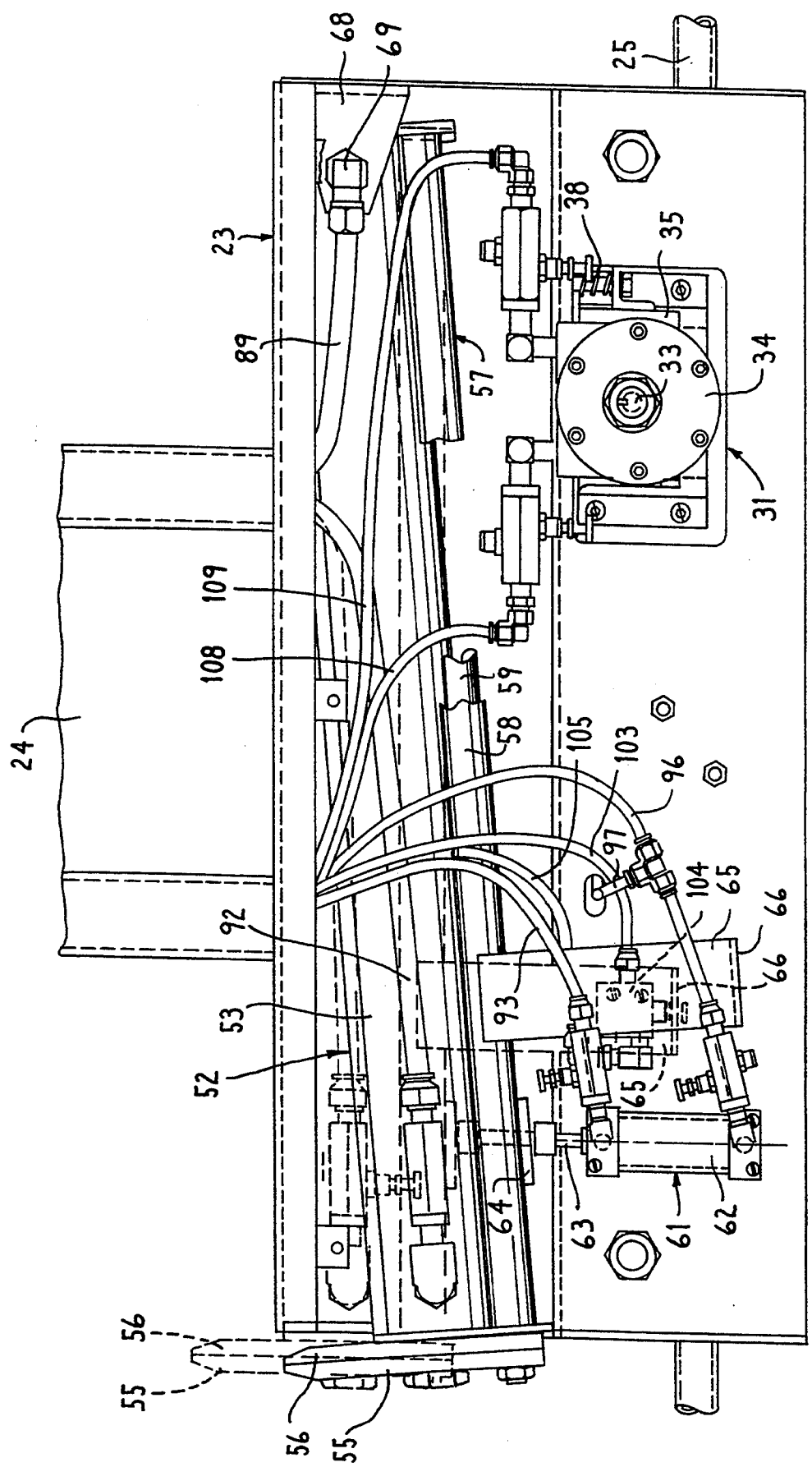
FIG. 4 is a side elevational view taken substantially along line 4—4 in FIG. 3 and showing the shifter unit associated with one side of the shifter assembly.
Figure 5:
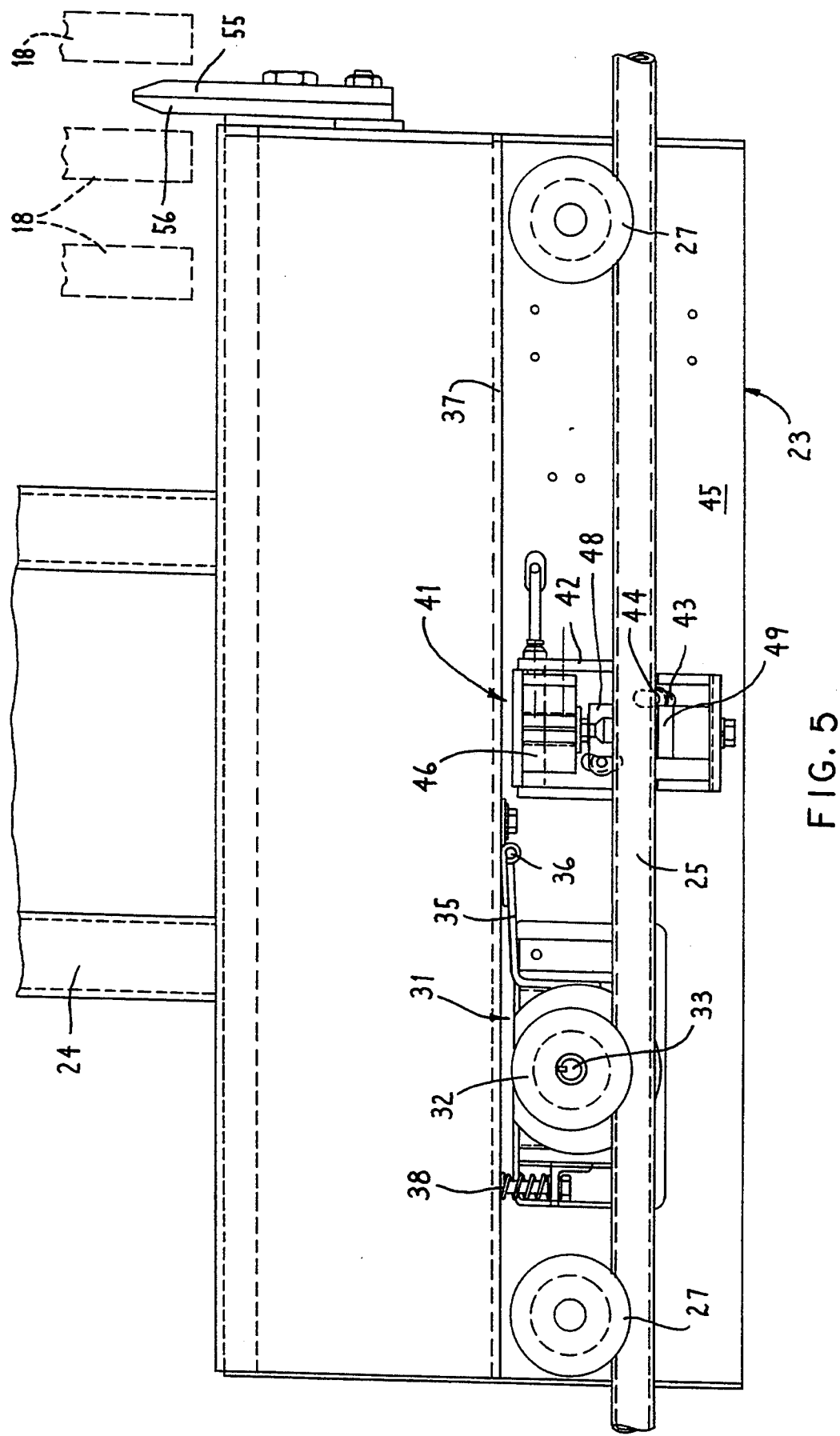
FIG. 5 is an elevational view taken substantially along line 5—5 in FIG. 3.

The one housing part 23, as illustrated by FIGS. 4 and 5, has a drive unit 31 mounted thereon for effecting movement of the shifter housing longitudinally of the press. This drive 31 includes a grooved drive roller 32 which is maintained in engagement with the upper side of the respective rod 25 which functions as a drive reaction member. The drive roller 32 is normally of a V-groove profile similar to the roller 27 illustrated on the left side of FIG. 3, and is preferably constructed of a plastic or rubberlike material so as to have a high friction and hence a secure rolling driving engagement with the rod 25. The drive roller 32 is secured to a horizontally extending drive shaft 33 which projects from a motor 34, the latter preferably being a hi-directional air-driven rotary drive motor of conventional construction. The motor 34 is mounted interiorly of the housing part 23 and the drive shaft 33 thereof projects through a housing wall 45, with the drive roller 32 being positioned between the housing wall 45 and the adjacent side rail 14 so as to be maintained in engagement with the respective rod 25.

A support or carriage 35 is disposed within the housing part and mounts the drive motor 34 thereon. The carriage 35 is joined by a horizontal hinge 36 to a housing wall 37 which extends generally horizontally and is part of the housing part 23. This hinge 36 defines a hinge axis which is approximately horizontal and extends generally parallel with the axis of the drive roller 32, and a spring 38 cooperates between the housing and the carriage 35 so as to urge the carriage downwardly about the hinge 36, thereby continually urging the drive roller 32 downwardly into secure driving engagement with the support rod 25.

Figure 7:
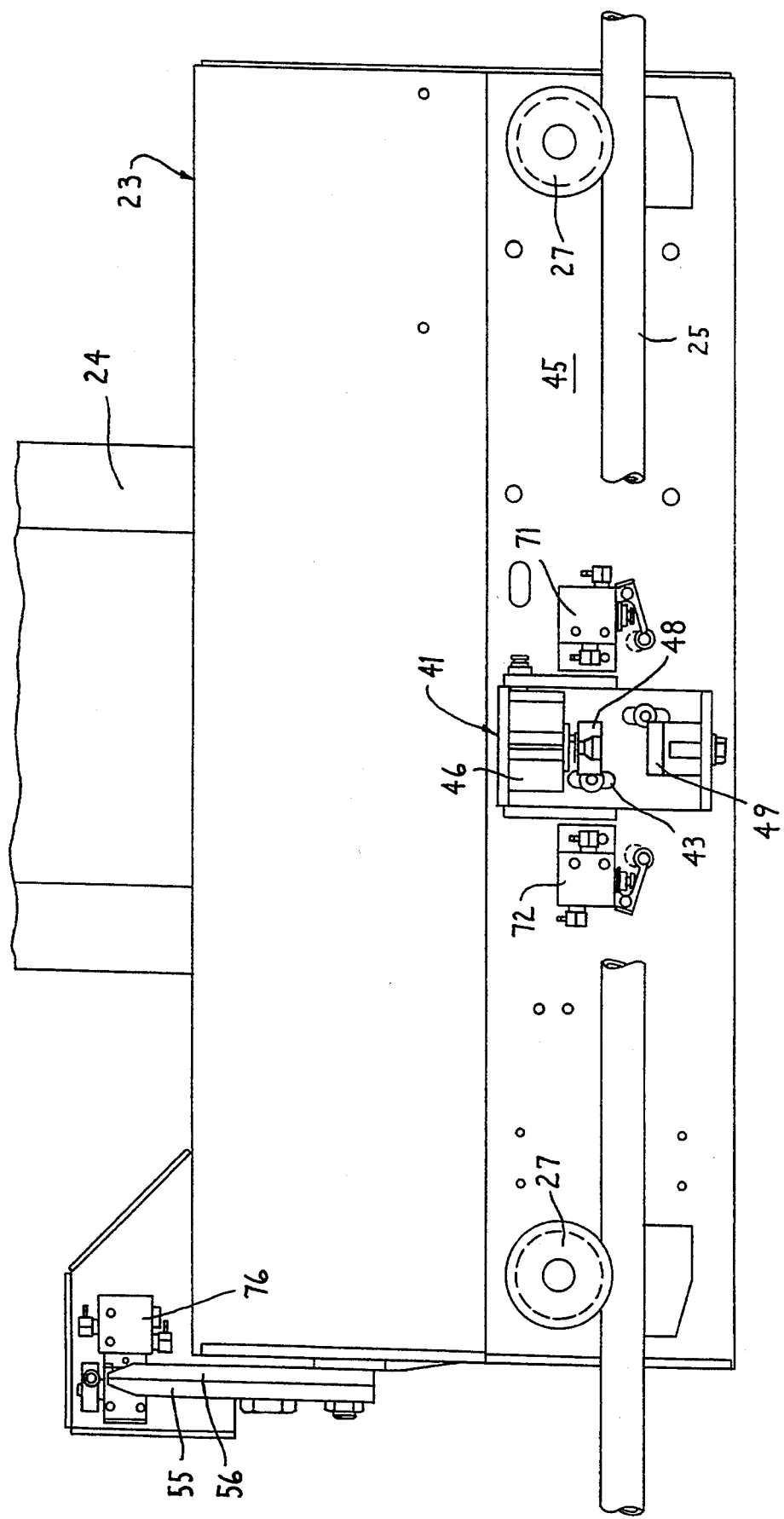
FIG. 7 is a side elevational view taken substantially along line 7—7 in FIG. 3.

A holding or braking device 41 (FIGS. 5 and 7) is provided on one, and preferably both, housing parts 23 for braking engagement with the rods 25 when the drive unit 31 is deenergized. Each braking unit 41 includes a generally C-shaped yoke or carrier 42 which is disposed directly adjacent the housing wall 45, and the carrier 42 has vertical slots 43 which accommodate fasteners 44 secured to the wall 45, whereby the carrier 42 can undergo limited vertical displacement relative to the housing part 23. The C-shaped configuration of the carrier is oriented so that it projects toward and partially surrounds the adjacent support rod 25, and a small air-actuated pressure cylinder 46 is mounted adjacent the upper end of the carrier 42 and has the piston rod thereof joined to an upper brake pad 48. A further and more specifically a lower brake pad 49 is secured to the carriage 42 adjacent the lower end thereof. The brake pads 48 and 49 are respectively disposed directly over and under the rod 25 and, when the cylinder 46 is pressurized, the upper pad 48 is pushed downwardly to react against the rod 25, thereby causing the carriage 42 to shift upwardly so that the lower pad 49 also reacts against the rod 25, thereby creating a braking or holding engagement with the rod 25 between the opposed pads 48 and 49. The pads 48 and 49 are preferably constructed of hard plastics and/or rubberlike materials.

Each housing part 23 of the shifter assembly 21 also mounts thereon a plate shifter 51 (FIGS. 4 and 6) which includes a fluid pressure cylinder 52 (herein referred to as the shifter cylinder) having a conventional cylindrical housing 53 from one end of which the piston rod 54 slidably projects. The other end of cylinder housing 53 is secured to a bracket 68 through a pivot or trunnion 69, the latter projecting horizontally in perpendicular relationship to the longitudinal direction of the press so that the entire shift cylinder 52 is hence vertically swingable about this pivot.

A first shifter member or blade 55 is fixedly secured to the free end of the piston rod 54, and a second shifter member or blade 56 is fixedly secured to the end of the cylinder housing 53 through which the piston rod projects. The shifter blades 55–56 are both platelike members which extend transversely of the piston rod in generally parallel relationship so as to substantially directly overlap when the piston rod is in the retracted position illustrated by FIG. 4.

The plate shifter 51 also includes a guide assembly 57 defined by an elongate guide tube 58 fixed to and extending parallel along the cylinder housing 53, and an elongate guide rod 59 slidably supported within the guide tube 58 and one end thereof projecting outwardly through the blade 56 for securement to the blade 55. Whenever the piston rod 54 is extended, then guide rod 59 is also extended and prevents rotation of the blade.

Figure 6:
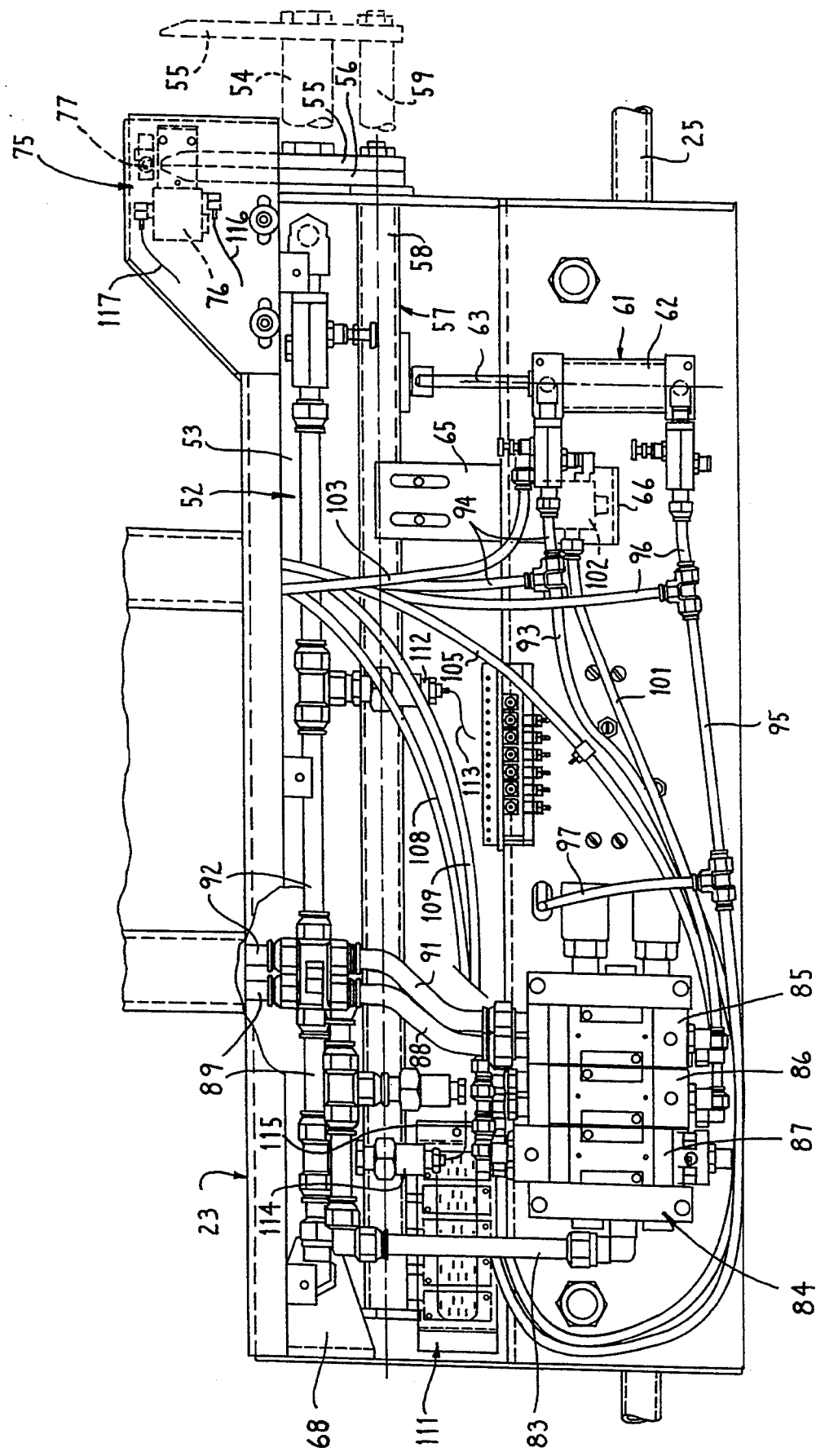
FIG. 6 is an elevational view taken substantially along line 6—6 in FIG. 3 and showing the shifter unit located on the other side of the assembly.

The plate shifter 51 is normally maintained in a lowered inactive position, substantially as illustrated by solid lines in FIG. 4. To move the plate shifter 51 into a raised position for engagement with the filter press plates, which raised position is indicated by FIG. 6, there is provided a lifting cylinder 61 for cooperation with each plate shifter. The lifting cylinder 61, like the shifter cylinder 52, is a double-acting pneumatic cylinder having a cylindrical housing 62 which is fixed relative to the housing part 23 and which has a piston rod 63 which is slidably extended from the upper end thereof. This piston rod 63, at the upper free end thereof, has a suitable cap which abuts against the underside of a plate 64 which is secured to the underside of the guide tube 58. The cylinder 61 is normally maintained in the contacted position illustrated by FIG. 4 and normally maintains the plate shifter 51 in the lowered inactive position. When cylinder 62 is energized so as to extend the piston rod upwardly, which upward extension is limited by an internal stop, then the plate shifter 51 is moved into the operative or shifting position illustrated by FIG. 6.

The guide tube 58 associated with the plate shifter 51 also has an activating plate 65 secured thereto, which plate projects downwardly and has a flange part 66 at the lower end thereof for engagement with a control valve, as explained hereinafter.

The one housing part 23 of the shifter housing also mounts thereon a pair of cam-actuated control valves 71 and 72 (FIG. 7) which, in the illustrated embodiment, are disposed in straddling relationship to the respective braking unit 41. These control valves 71 and 72 are normally closed and are positioned so as to contact and be respectively actuated (i.e. opened) by stops 73 and 74 (FIG. 2) which are fixedly mounted on the press adjacent the opposite ends thereof. More specifically, control valve 71 cooperates with the stop 73 to prevent further forward (rightward) movement or the shifter assembly 21 in FIG. 2 and causes reverse movement thereof back to a home position adjacent the leftward end of the press, which home position is defined when the control valve 72 is engaged and actuated by the stop 74 so as to deenergize the drive motor.

The plate shifter assembly 21, on the trailing end of one of the housing parts 23, is also provided with a plate sensor 75 (FIG. 6) which is positioned closely adjacent the respective plate-contacting blades 54–55. This plate sensor 75 includes a normally-closed pneumatic control valve 76 which is opened and closed by an elongate sensing lever 77 (FIG. 3) which is normally maintained (as by spring urging) in a position wherein it projects horizontally inwardly so as to be positioned for contact with the handles 18 on the filter plates 17. When the sensing lever 77 contacts one of the plate handles 18, the lever 77 is horizontally swung outwardly and causes actuation (i.e. opening) of the control valve 76 to effect stoppage of the drive motor 34 for the shifter assembly, as explained hereinafter.

The filter plate shifter assembly 21 is, in the preferred and illustrated embodiment, entirely pneumatically controlled and driven, and for this purpose a suitable air connector 81 is provided on the housing arch 24 for connection to a main supply hose or conduit 82, which in turn communicates with an external source of pressurized air, such as a compressor. The supply conduit 82 will typically have a suitable on-off valve 79 associated therewith and operated either manually or automatically for controlling supply of pressurized air to the shifter assembly.

The pressurized air from the connector 82 then flows into a supply conduit 83 which extends along the housing arched part 24 and into one of the side housing parts 23 for connection to a manifold assembly 84 (FIG. 6), the latter having air valves 85, 86 and 87 associated therewith, such valves typically being four-way spool valves which are pilot operated. The valve 85 is provided for controlling flow of air to the shifter cylinders 52, and hence a first load conduit 88 joins to one load port of valve 85, and this conduit 88 joins through a tee to branch conduits 89, one of which joins to the end of the adjacent shifter cylinder 52 for causing extension of the cylinder when pressurized air is supplied thereto, and the other branch conduit 89 extends upwardly through the arched housing part 24 and is similarly joined to the extending end of the shifter cylinder 52 provided in the other housing part 23. A second load conduit 91 joins to a second load port associated with the valve 85, and this load port 91 in turn joins through a tee to a pair of branch conduits 92, each of which joins to the other end of the respective shifter cylinder 52, namely the end which causes contraction of the shifter cylinder 52.

The valve 86 has one of the load ports thereof joined to a conduit 93 which in turn, through a suitable tee, joins to a pair of branch conduits 94, each of which couples to the upper end of the respective lifting cylinder 61 so as to permit contraction of this cylinder when pressurized air is supplied through the conduits 93 and 94. A further conduit 95 connects to the other load port of the valve 86 and couples through a tee to a further pair of branch conduits 96, each of which connects to the lower end of the respective lifting cylinder 61 so as to cause extension of the cylinder when pressurized air is supplied through the conduits 95 and 96. Further branch conduits 97 also connect to the conduits 95 or 96, and each of these branch conduits 97 connects to the respective activating cylinder 46 associated with the braking unit 41 so as to activate the braking units whenever pressurized air is supplied to the lower end of cylinders 61 so as to effect lifting of the plate shifters 51.

To ensure that the shifter cylinders 52 can be energized and extended only when in the raised position, there is also provided a control circuit which includes a conduit 101 which couples to a port of the valve 86 so as to receive pressurized air therein only when the conduit 95 is also pressurized. This conduit 101 couples to a normally-closed on-off control valve 102 which is stationarily mounted on the housing, but which is moved into an open position due to actuation thereof by the flange 66 when the plate shifter 51 reaches its upper position. A further conduit 103 connects to the downstream side of valve 102, and this conduit 103 extends through the housing arch 24 and couples to the upstream side of a further normally-closed on-off control valve 104 (FIG. 4) mounted on the other housing part 23. This latter valve 104 is also opened by engagement with the flange 66 only when the respective shifter unit 51 is in the fully raised position. Control valve 104 has a further conduit 105 coupled to the downstream side thereof, and this latter conduit extends back through the housing arch 24 and couples to a pilot port for the valve 85, whereby this latter valve 85 is shifted by presence of pressure in conduit 105 so as to then permit valve 85 to supply pressurized air into the conduits 88, 89 for effecting extension of the shifter cylinders 52.

A further pair of conduits 108 and 109 (FIG. 4) are coupled to the pneumatic motor 34 for causing rotation of the motor in opposite directions, depending upon which conduit 108 or 109 is supplying pressurized air to the motor. These conduits 108 and 109 extend through the housing arch 24 and respectively couple to load ports associated with the valve 87.

As illustrated by FIG. 6, the housing part 23 also mounts therein a logic panel 111 in close proximity to the manifold 84. This logic panel 111 is defined by a plurality of conventional miniature air valves, typically spool-type air valves, which are responsive to very small pneumatic pressure signals for in turn providing pneumatic pressure signals for controlling the valves 85–87. For this purpose, a first air sensor 112 is associated with one of conduits 92 and hence senses the exhaust air pressure from the shifter cylinders 52 during extension of the shifter cylinders. This air sensor 112 is coupled to a small tube 113 which in turn couples to a port associated with one of the control valves on the logic panel 111 for supplying a small air pressure signal thereto. A similar air sensor 114 is associated with the conduit 89 and again senses the pressure therein when air is exhausting through this conduit due to contraction of the plate shifter cylinders 52, and this sensor 114 in turn joins to a small tube 115 which also transmits a low pressure signal to one of the valves associated with the logic panel 111.

Further tubes 116 and 117 (FIG. 6) are coupled to the control valve 76 associated with the plate sensor, and these tubes in turn couple to a valve associated with the logic panel 111 for transmitting an air pressure signal therethrough when the plate sensing lever 77 contacts a plate handle and is deflected so as to open the valve 76.

A further pair of sensor tubes 121–122 couple to the control valve 71 (FIG. 7), and a similar pair of sensor tubes 123–124 couple to the other control valve 72. These tubes also connect with the valve 87 to provide for desired control over the drive motor 34.

The operation of the filter press incorporating the shifter assembly of the present invention will now be briefly described to ensure a complete understanding thereof.

The shifter assembly 21 will normally be maintained at the leftward end (FIG. 2) of the press, this being the normal home position. When emptying of the press is desired, a signal will be transmitted to the main control valve 79, either manually or from a automatic controller such as a microprocessor. Opening of valve 79 supplies pressurized air to the shifter assembly 21, specifically through the control valve passage RV5-2 to effect shifting of the valve 87 away from its closed center position against the urging of a restoring spring so that main supply conduit 83 then communicates through the valve 87 to supply pressurized air to conduit 109 to effect "forward" rotation of drive motor 34 and drive roller 32. This causes the entire shifter assembly 21 to move forwardly along the rods 25 until the shifter housing passes over the head 15 (which has already been moved into an open position) and over the endmost ones of the filter plates 17. When the shifter assembly 21 approaches the endmost plate 17, the plate sensing lever 77 contacts the handle 18 of the endmost plate and is angularly deflected through a small angle, such as about 30°. This causes opening of control valve 76 whereby an air pressure signal is transmitted through the valve 76 and through the tubes 116–117 back to the logic panel 111. This effects shifting of one of the logic control valves, such as a double detent valve RV5, so that flow passage RV5-2 closes (i.e., prevents flow) which shifts the valve 87 to terminate supply of pressurized air to the drive motor 34, thereby stopping the drive motor. At the same time flow passage RV5-1 of valve RV5 opens (i.e. permits flow) so that pressure fluid is supplied to connection E of valve 86 which effects shifting of this valve away from its normal spring-urged position so that pressurized air is then supplied from the manifold through the valve 86 to the conduits 95 and 101. Conduit 95 in turn supplies pressurized air to the conduits 97 which activate the cylinders 46 to apply the brake pads 48–49 to the rods 25 to assist in holding the shifter assembly 21 stationary. The pressurized air in conduit 95 is also supplied to conduits 96 and into the bottoms of the lift cylinders 61. These cylinders extend the piston rods thereof, and pivot the shift cylinders 52 upwardly so that the blades 55–56 are inserted into the spaces defined between the handles 18 of the adjacent two endmost filter plates 17, substantially as illustrated by the dotted line position shown in FIG. 5.

When the shift cylinders 61 reach the fully extended position, namely the raised position for the shift cylinders 52, the flanges 62 on the activating plates 65 contact the plungers on the valves 102 and 104 and effect opening thereof. The pressurized air in the conduit 101 (which is supplied thereto simultaneously with the supply to the conduit 95) thence passes through the opened valve 102 and through the intermediate conduit 103 and thence through the other opened valve 104 so as to be supplied through conduit 105 to effect shifting of the valve 85 away from its normal spring-urged position. The latter is suitably shifted so that pressure fluid in the manifold then flows through valve 85 into conduit 88 and branch conduits 89, which supply pressurized air into the extending ends of shift cylinders 52. This causes the piston rods 54 and the blades 55 to be extended outwardly, causing the blades 55 to contact the handles 18 on the endmost filter plate 17, thereby shifting this latter plate toward the opened head 15. When the shifted plate 17 moves into contact either with the head 15 or into contact with a previously shifted filter plate, the stoppage of movement of the piston rod results in the air pressure in conduit 92 as connected to the exhaust end of the shifter cylinder 52 to fall to a very low value, such as a pressure value of about three psi or less. This low pressure air signal is then transmitted from the sensor 112 through line 113 back to the logic panel 111 to effect shifting of a small control valve thereof, such as a valve RV2 which is spring loaded to shift at such low pressure, which valve in turn terminates the pilot pressures to the pilot lines A and E of the valves 85 and 86. This effects spring-urged shifting of valve 85 so that the main pressure fluid then flows through valve 85 into the other main conduit 91, and thence into conduits 92 which connect to the retract ends of shift cylinders 52. This hence causes retraction of the piston rods 54 and blades 55. The cut off of the pilot signal E to valve 86 effects spring-urged shifting thereof so that conduit 95 is connected to exhaust and pressurized air is supplied to the conduit 93 and branch conduits 94, which in turn supply pressurized air to the upper ends of the lift cylinders 61 to cause contraction thereof, and hence effect lowering of the shifter cylinders 52 back to their original lower positions as determined by internal mechanical stops. When the piston rods 54 are fully retracted, the exhaust air pressure from the other end of the cylinder 52 as measured in the conduit 89 falls below a small pressure level of about three psi, and this low air pressure signal is transmitted from sensor 114 through tube 115 back to the logic panel 111 to shift one of the control valves RV3 thereof, and this in turn allows a control signal to be supplied to the pilot F of the valve 87 which is suitably shifted to again allow pressurized air to be supplied to conduit 109 to again initiate forward rotation of the drive motor 34. This advances the shifter housing 22 until the plate sensing lever 77 contacts the handle on the next filter plate and effects stoppage of the shifter housing, and the entire cycle is then repeated.

The shifting cycle continues until the last filter plate 17 is shifted, at which time the shifter housing is again moved forwardly until the control valve 73 contacts the stop 71 at the far end of the press and is opened. This causes a control signal (i.e. an air pressure signal) to be transmitted through the valve 73 to the pilot D of valve 87, and this in turn effects shifting of valve 87 from one end position into an opposite end position so that supply of pressure fluid to conduit 109 is terminated, and instead pressure fluid is supplied to conduit 108 so as to drive the motor 34 in the reverse rotational direction. This causes the entire shifter assembly 21 to be driven rearwardly along the rods 25. When the shifter moves away from and disengages stop 73, valve 71 returns to a non-flow (i.e. closed) position, but pressure fluid is supplied to pilot D from line 108. As shifter 21 reaches the home position as defined by the stop 72, the control valve 74 contacts the stop 72, valve 72 moves into a non-flow position and transmits an air pressure control signal back to the logic panel 111 which in turn transmits an air pressure signal deactivating the main control valve 79 if desired. This closure of valve 72 also disrupts pressure at pilot D whereby the springs shift the valve 87 into the closed middle position which terminates supply of pressurized air to the motor 34, and hence stops movement of the shifter assembly.

During the individual shifting of the plates 17, the filtrate collected between adjacent filter plates will be discharged by gravity downwardly into a suitable collecting bin.

While the main control valve 79 has been diagrammatically illustrated as disposed at a remote location, such as on the main control panel for the press, it will be apparent that this or an auxiliary control valve can be provided directly on the shifter assembly 21 if desired so as to permit manual actuation and control at this location.

While the shifter assembly 21 provides the brakes or holding devices 41 for engaging the rods 25 to hold the shifter assembly stationary during the individual plate shifting operations, it will be apparent that in some situations the reactive load imposed on the shifter assembly by the filter plate may tend to dislodge or move the shifter assembly. In such instance it will be noted that the stationary plate 55 will be positioned directly adjacent and react against the handle 18 of the next adjacent plate 17, the latter being stationarily held due to its being stacked against the remaining plates and the fixed head. This plate 55, by reacting against the handle of the next filter plate, prevents any significant movement of the shifter assembly 21 during the actual plate shifting operation.

While the system as described above employs all pneumatic drives (motors and cylinders) and controls for carrying out the shifter operation, it will be appreciated that other fluid controls could be utilized if desired. Further, electrical control devices could also be utilized if desired, although the entire fluid-actuated arrangement and specifically a pneumatically-actuated arrangement is preferred so as to eliminate the need for providing any electrical transmission lines connected to the shifter assembly.

Figure 8:
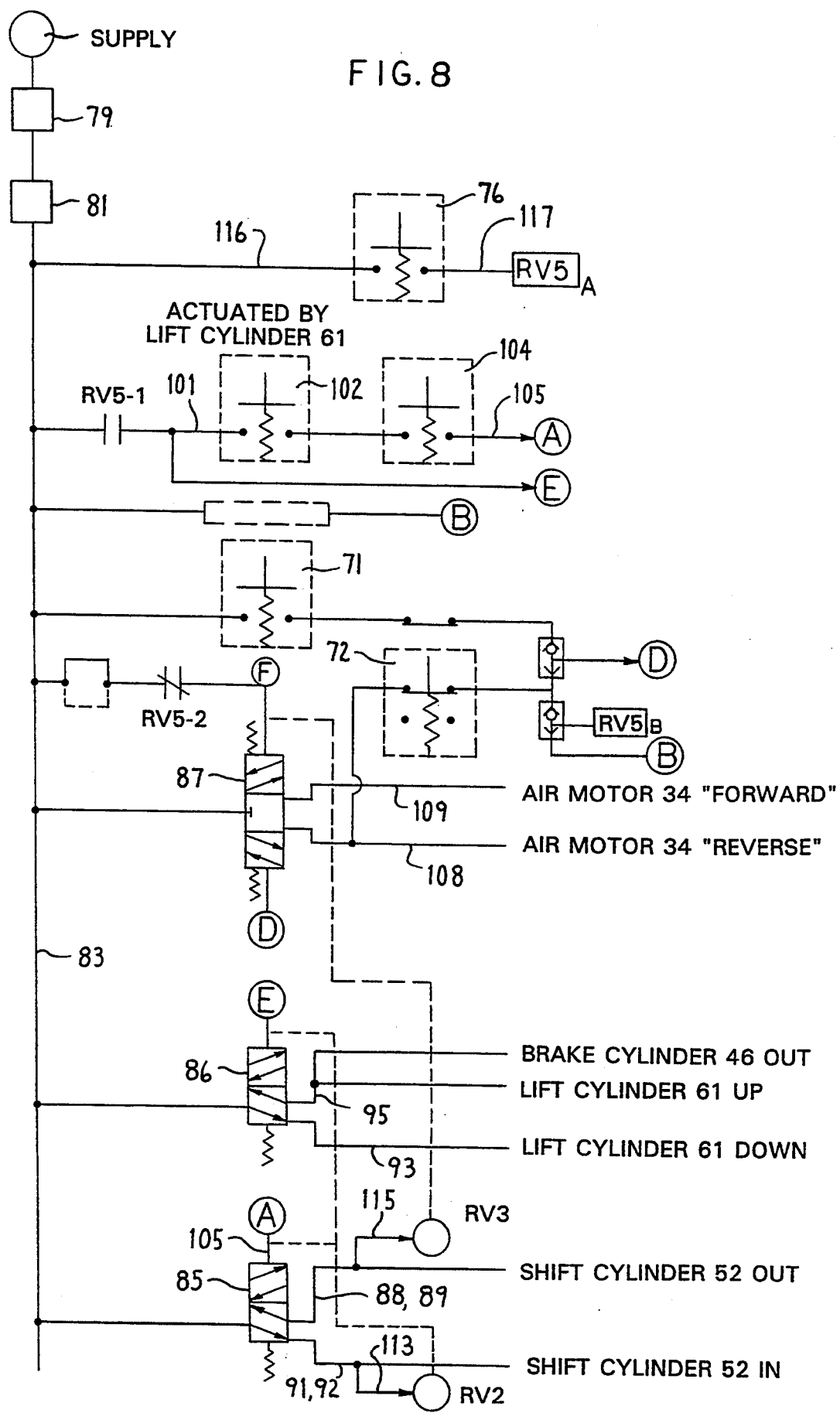
FIG. 8 is a partial schematic of the air control circuit.

The flow control circuit is only partially and schematically shown in FIG. 8. However, the provision of the various valves and the connections therebetween is generally conventional, and in fact can assume many different configurations, as will be readily apparent to one of ordinary skill in such technology.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter press including a frame having a pair of horizontally elongate and generally parallel side rails which extend lengthwise of the press and are sidewardly spaced apart, a first head structure stationarily mounted adjacent one end of said rails, a second head structure mounted on said rails for movement horizontally toward and away from said first head structure for respective closing and opening of said press, a plurality of vertically enlarged filter plates disposed in generally side-by-side relationship to define a horizontally extending stack between said first and second head structures when said press is closed, said filter plates extending transversely between and being movably supported on said side rails, each said filter plate having parts which project outwardly from opposite side edges thereof, and a shifter assembly for effecting shifting of individual said filter plates along the side rails toward the second head structure when said second head structure is in an open position, said shifter assembly including a shifter housing movable lengthwise along the press, said shifter housing having a pair of housing parts which are disposed on opposite sides of the press so that each said housing part is disposed adjacent a respective one of said side rails, said shifter housing also including a bridging part which extends transversely of said press and rigidly joins said housing parts together, the improvement wherein said shifter assembly includes:

drive means mounted on only one of said housing parts for linearly drivingly moving said housing lengthwise of said press generally along and parallel to said side rails, said drive means including a drive motor mounted on said one housing part and a driving member which is drivingly coupled to and driven by the driving motor, the driving member being disposed in reactive driving engagement with an elongate member which is fixed relative to the respective side rail and extends lengthwise therealong;

filter plate shifting means including a shifter mechanism mounted on each said housing part for engaging the projecting part on a respective side of an endmost filter plate as associated with the stack of filter plates which projects away from said first head structure for effecting slidable shifting of the endmost plate away from a closed position adjacent the stack into an open position adjacent the opened second head structure;

control means mounted on said shifter housing to cause automatic and sequential shifting of individual filter plates by the shifting means from the closed position to the open position, including means for activating said drive means to forwardly advance the shifter housing toward the next adjacent plate after the endmost plate has been shifted into the open position;

said control means including means mounted on said housing for sensing said endmost filter plate of said stack and means for stopping said drive means upon sensing said endmost plate;

said control means also including means for automatically activating said shifter means after said sensing means senses said endmost plate and said drive means is stopped so that said shifter means causes automatic shifting of said endmost plate into said open position, said control means including further means for automatically returning said shifter means from said open position and for automatically reactivating said drive means to forwardly advance the shifter housing toward the next adjacent plate.

2. A filter press according to claim 1, wherein said drive means and said shifter mechanisms are all operated by a pressure fluid supplied by a pressure fluid source.

3. A filter press according to claim 2, wherein said pressure fluid comprises air, and wherein said shifter mechanism is free of electrical connections or controls.

4. A filter press according to claim 1, wherein said drive motor comprises a rotary air-driven motor, and said drive member comprising a rotary drive wheel disposed in rolling driving engagement with the elongate member.

5. A filter press according to claim 4, including brake means mounted on at least one of said housing parts to hold said shifter housing stationary when said drive means is deenergized, and said control means including means for automatically activating said brake means into an engaged position when said drive means is deenergized and for deactivating the brake means when the drive means is energized.

6. A filter press according to claim 1, wherein said drive motor comprises a rotary motor mounted on said one housing part for movement with said shifter housing, said drive member comprising a rotary drive wheel coupled to and driven from said rotary motor, said wheel being disposed with a periphery thereof in rolling driving engagement with said elongate member.

7. A filter press according to claim 6, wherein said drive wheel is urged by a spring into rolling and driving engagement with said elongate member.

8. A filter press according to claim 1, wherein said drive motor comprises a rotary air-driven motor and said drive member comprises a rotary drive wheel disposed in rolling driving engagement with the elongate member, and each said shifter mechanism includes an air-actuated shifter cylinder having an extendable piston rod provided with a plate-engaging shift element thereon, each said shifter mechanism also including an air-actuated lifting cylinder coupled to said shifting cylinder for effecting raising and lowering of said shifting cylinder between shifting and nonshifting positions, wherein said shifting position is disposed above said nonshifting position.

9. A filter press according to claim 8, including air-actuated brake means mounted on one of said housing parts to hold said shifter housing stationary when said drive means is stopped.

10. A filter press according to claim 8, wherein said control means includes (1) first means associated with one said shifter cylinder to effect retraction of the shifting cylinders upon sensing a first pressure signal following completion of a plate shifting movement and (2) second means to advance the shifter housing toward the next filter plate upon sensing a second pressure signal upon retraction of said shift cylinders.

11. A filter press according to claim 10, including air-actuated brake means mounted on one of said housing parts to hold said shifter housing stationary when said drive means is stopped.

* * * * *